US012627332B2

(12) United States Patent
Razavi Majomard et al.

(10) Patent No.: US 12,627,332 B2
(45) Date of Patent: May 12, 2026

(54) TIME-DIVISION MULTIPLEXING TO REDUCE ALIEN CROSSTALK IN CABLES

(71) Applicant: Marvell Asia Pte Ltd, Singapore (SG)

(72) Inventors: Seid Alireza Razavi Majomard, Belmont, CA (US); David Shen, Saratoga, CA (US)

(73) Assignee: INFINEON TECHNOLOGIES AMERICAS CORP., El Segundo, CA (US)

( * ) Notice: Subject to any disclaimer, the term of this patent is extended or adjusted under 35 U.S.C. 154(b) by 702 days.

(21) Appl. No.: 17/752,534

(22) Filed: May 24, 2022

(65) Prior Publication Data

US 2022/0376739 A1     Nov. 24, 2022

Related U.S. Application Data

(60) Provisional application No. 63/192,438, filed on May 24, 2021.

(51) Int. Cl.
H04B 3/32          (2006.01)
(52) U.S. Cl.
CPC ...................................... H04B 3/32 (2013.01)
(58) Field of Classification Search
CPC .................................. H04B 3/32; H04L 5/22
See application file for complete search history.

(56) References Cited

U.S. PATENT DOCUMENTS

| | | | |
|---|---|---|---|
| 8,179,910 B2 | 5/2012 | Diab et al. | |
| 9,893,756 B1 | 2/2018 | Sedarat et al. | |
| 10,069,521 B1 * | 9/2018 | Farjadrad | H04B 3/32 |
| 10,211,881 B2 * | 2/2019 | Wang | H04B 3/32 |
| 10,754,402 B2 * | 8/2020 | Atkinson | G06F 13/4282 |
| 2005/0063422 A1 * | 3/2005 | Lazar | H04B 3/542 |
| | | | 709/200 |
| 2008/0292007 A1 * | 11/2008 | Lida | H04L 27/0008 |
| | | | 375/257 |

(Continued)

FOREIGN PATENT DOCUMENTS

| | | |
|---|---|---|
| WO | 2012084221 A2 | 6/2012 |

OTHER PUBLICATIONS

International Search Report and Written Opinion for PCT/US2022/030749, mailed Sep. 16, 2022 (12 pages).

(Continued)

*Primary Examiner* — Thomas R Cairns
*Assistant Examiner* — Kai Chang

(57)          ABSTRACT

A transceiver transmits data via a first cable among a plurality of cables in a wired communication network, and selectively operates in one of (i) an active mode for transmitting data to a link partner via the first cable and (ii) a low power mode during which the transceiver quiets transmissions to conserve power. A crosstalk detector determines that transmission of data in the first cable is causing crosstalk in one or more second cables. A controller, in response to the crosstalk detector determining that transmission of the data in the first cable is causing crosstalk in one or more second cables, controls the transceiver to operate in the low power mode during a plurality of first time periods to reduce crosstalk in the one or more second cables during the plurality of first time periods.

23 Claims, 10 Drawing Sheets

(56)                References Cited

U.S. PATENT DOCUMENTS

| | | | | |
|---|---|---|---|---|
| 2010/0115316 | A1* | 5/2010 | Diab | G06F 1/3234 |
| | | | | 713/323 |
| 2013/0070823 | A1* | 3/2013 | Malkin | H04L 25/03878 |
| | | | | 375/220 |
| 2013/0279552 | A1* | 10/2013 | Gomez Martinez | H04L 25/03 |
| | | | | 375/227 |
| 2013/0308941 | A1* | 11/2013 | Diab | H04Q 11/0067 |
| | | | | 398/45 |
| 2015/0280826 | A1* | 10/2015 | Effenberger | H04J 14/0282 |
| | | | | 398/66 |
| 2015/0365256 | A1* | 12/2015 | Afkhami | H04B 3/32 |
| | | | | 375/257 |
| 2016/0323014 | A1* | 11/2016 | Starr | H04B 3/32 |
| 2019/0280795 | A1* | 9/2019 | Kuipers | H04L 5/14 |
| 2020/0235780 | A1* | 7/2020 | Bains | H04B 3/23 |
| 2020/0295911 | A1 | 9/2020 | Wu et al. | |
| 2020/0326771 | A1 | 10/2020 | Wu et al. | |
| 2021/0013925 | A1* | 1/2021 | Kassel | H04M 11/062 |
| 2022/0103397 | A1 | 3/2022 | Fung et al. | |

OTHER PUBLICATIONS

Barrass et al., "10GBASE-T: 10 Gigabit Ethernet over Twisted-pair Copper," v. 1.0, Ethernet Alliance, 44 pages (Aug. 2007).
Jones, "10GBASE-T Tutorial Overview," Institute for Electrical and Electronics Engineers, 34 pages, available at https://www.ieee802.org/3/10GBT/public/jan03/jones_2_0103.pdf (Jan. 2003).
Muller et al., "IEEE 802 10GBASE-T Tutorial Overview," Institute for Electrical and Electronics Engineers, 56 pages, available at https://www.ieee802.org/3/10GBT/public/nov03/10GBASETtutorial.pdf (Nov. 2003).
Ungerboeck, "10GBASE-T: 10Gbits/s Ethernet over copper," Broadcom, 23 pages, available at https://www.southampton.ac.uk/~sqc/EL336/10GBASE-T.pdf (Sep. 2006).
"How Much Does Office Building Wiring Cost?" CostOwl.com, available at https://www.costowl.com/b2b/cabling-wiring/cabling-wiring-office-building-cost/#network-cabling-considerations, last updated Dec. 8, 2021 (2 pages).

* cited by examiner

Figure 3A:
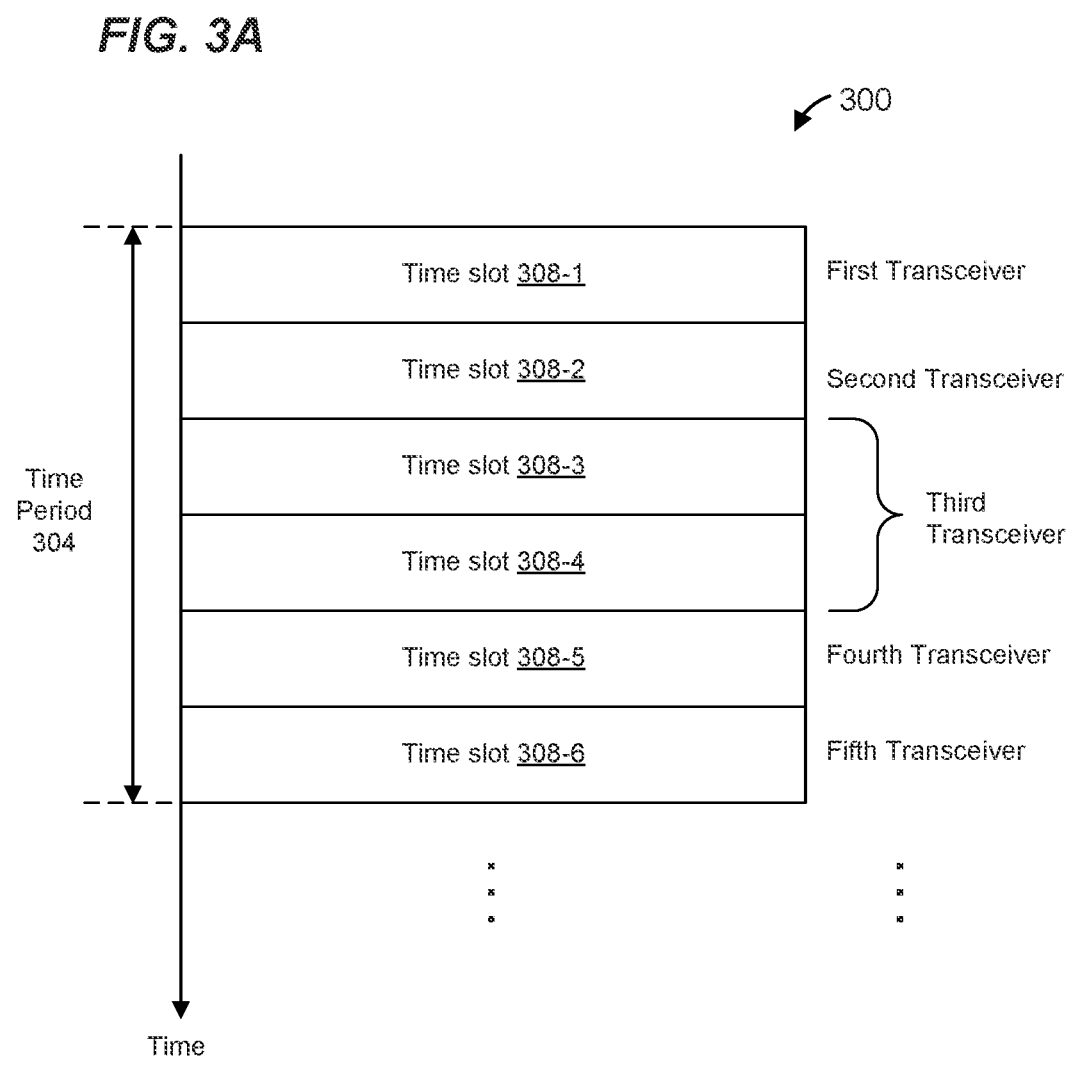

Time Period 304

| Time slot 308-1 | First Transceiver |
| Time slot 308-2 | Second Transceiver |
| Time slot 308-3 | |
| Time slot 308-4 | Third Transceiver |
| Time slot 308-5 | Fourth Transceiver |
| Time slot 308-6 | Fifth Transceiver |

Time

Figure 3B:
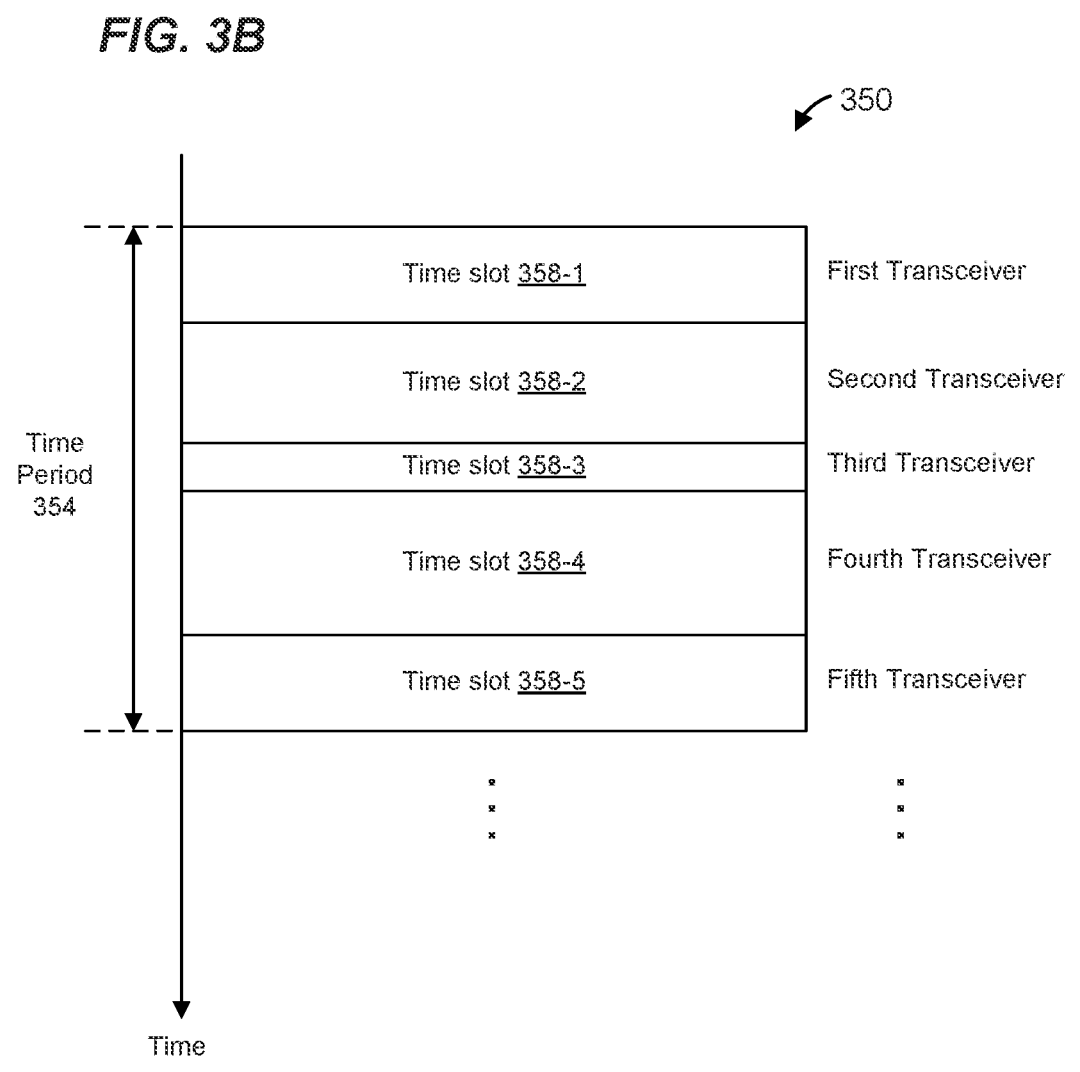

| | |
|---|---|
| Time slot 358-1 | First Transceiver |
| Time slot 358-2 | Second Transceiver |
| Time slot 358-3 | Third Transceiver |
| Time slot 358-4 | Fourth Transceiver |
| Time slot 358-5 | Fifth Transceiver |

Time Period 354

Time

*FIG. 6*

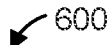
600

```
┌─────────────────────────────────────┐
│  Transmitting, by a first transceiver, data via a first  │
│              cable 604               │
└─────────────────────────────────────┘
                    │
                    ▼
┌─────────────────────────────────────┐
│  Determining that transmission of the data via the  │
│  first cable is causing crosstalk in one or more  │
│            second cables 608         │
└─────────────────────────────────────┘
                    │
                    ▼
┌─────────────────────────────────────┐
│  In response to detecting that transmission of the  │
│  data via the first cable is causing crosstalk in one  │
│  or more second cables, quieting transmission by  │
│  the first transceiver during a plurality of first time  │
│  periods to reduce crosstalk in the one or more  │
│  second cables during the plurality of first time  │
│             periods 612              │
└─────────────────────────────────────┘
```

*FIG. 7*

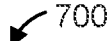
700

Receiving, at a controller, crosstalk level
information from a plurality of transceivers coupled
to respective cables 704

In response to the crosstalk level information
received at 704, controlling, by the controller, one
or more of the transceivers to operate in a low
power mode during respective time periods to
reduce crosstalk in one or more cables
respectively coupled to one or more other
transceivers 708

900

Determine whether alien crosstalk is occurring in cable 904

In response to determining that alien crosstalk is occurring in the cable, quiet transmission by transceiver for time period 908

In response to determining that alien crosstalk is not occurring in the cable, transmit, by transceiver, via the cable for time period 912

TIME-DIVISION MULTIPLEXING TO REDUCE ALIEN CROSSTALK IN CABLES

CROSS REFERENCES TO RELATED APPLICATIONS

This application claims the benefit of U.S. Provisional Patent Application No. 63/192,438, entitled "Data Rate Optimization Using Energy Efficient Ethernet in High Alien Crosstalk Environments," filed on May 24, 2021, the disclosure of which is hereby expressly incorporated herein by reference in its entirety.

FIELD OF TECHNOLOGY

The present disclosure relates generally to communication networks, and more particularly to Ethernet communications via cables.

BACKGROUND

One gigabit per second (1G) and slower Ethernet networks have proliferated in office buildings, schools, residential housing, etc., over the past two decades. 1G and slower Ethernet networks often employ Category 5 (Cat5) or Category 5e (Cat5e) twisted pair copper cables, comprising multiple twisted wire pairs. As a result, there is currently a large installed base 1G and slower Ethernet networks using Cat5 and Cat5e cables.

The Institute for Electrical and Electronics Engineers (IEEE) published several standards for Ethernet networks that utilize 10 gigabit per second (10G) communications over optical and copper cabling in the early to mid-2000s. For example, the IEEE 802.3ae Standard (2002) defines a communication protocol for 10G Ethernet over optical fiber, and the IEEE 802.3ak Standard (2004) defines a communication protocol for 10G Ethernet over twin-axial cable. The IEEE 802.3an Standard (2006) defines a communication protocol for 10G Ethernet over copper twisted pair cable.

The higher baud rate of 10G Ethernet as compared to 1G and slower Ethernet tends to cause more crosstalk between twisted pair copper cables. Cat5 and Cat5e cables generally are not rated for use with 10G Ethernet, mainly due to reduced performance caused by increased crosstalk between cables at the higher baud rate of 10G Ethernet. For example, Cat5 and Cat5e cables are rated up to 100 MHz, whereas 10G Ethernet over copper twisted pair cable (the IEEE 802.3an Standard) utilizes a baud rate of 800 Mega symbols per second (MSps). The minimum bandwidth required for a given baud rate is at least twice the baud rate. Thus, for 10G Ethernet, the minimum bandwidth required is 400 MHz. As discussed above, however, Cat5 and Cat5e are rated up to only 100 MHz.

On the other hand, Category 6 (Cat6) and Category 6A (Cat6A) cables are designed for higher baud rates (and they mitigate crosstalk at the higher baud rates) and are rated for up to 250 MHz and 500 MHz, respectively. Thus, it is common for 10G Ethernet network deployments to use Cat6 or Cat6A (or even Category 7 (Cat7)) cables.

Partly as a result of the high cost of replacing the large existing installed base of Cat5 and Cat5e cables with Cat6 or Cat6A (or even Cat7) cables, there is currently a relatively small number of 10G Ethernet networks in office buildings, schools, residential housing, etc.

SUMMARY

In an embodiment, a first communication device in a wired communication network comprises: a first transceiver configured to transmit data via a first cable among a plurality of cables in the wired communication network, and to selectively operate in one of (i) an active mode for transmitting data to a second communication device via the first cable and (ii) a low power mode during which the first transceiver quiets transmissions to conserve power; a crosstalk detector that is configured to determine that transmission of data in the first cable is causing crosstalk in one or more second cables among the plurality of cables; and a controller that is configured to, in response to the crosstalk detector determining that transmission of the data in the first cable is causing crosstalk in one or more second cables, control the first transceiver to operate in the low power mode during a plurality of first time periods to reduce crosstalk in the one or more second cables during the plurality of first time periods.

In another embodiment, a method for mitigating effects of crosstalk in a wire communication network includes: transmitting, by a first transceiver of a first network device, data via a first cable among a plurality of cables; determining, at circuitry associated with the first transceiver, that transmission of data in the first cable is causing crosstalk in one or more second cables among the plurality of cables; and in response to determining that transmission of the data in the first cable is causing crosstalk in one or more second cables, quieting transmission by the first transceiver via the first cable during a plurality of first time periods to reduce crosstalk in the one or more second cables during the plurality of first time periods.

In yet another embodiment, a communication device in a wired communication network comprises: a plurality of transceivers, each transceiver being configured to transmit data via a respective cable among a plurality of cables in the wired communication network, and to selectively operate in one of (i) an active mode for transmitting data to a respective link partner via the respective cable and (ii) a low power mode during which the respective transceiver quiets transmissions to conserve power; and a controller that is configured to: receive crosstalk level information from the plurality of transceivers, the crosstalk level information indicating respective levels of alien crosstalk in respective cables among the plurality of cables, and in response to the crosstalk level information, control one or more transceivers among the plurality of transceivers to operate in a low power mode during respective time periods to reduce crosstalk in one or more cables respectively coupled to one or more other transceivers.

BRIEF DESCRIPTION OF THE DRAWINGS

FIG. 3A is a simplified timing diagram illustrating an example TDM scheme involving more than two transceivers, according to an embodiment.

FIG. 3B is a simplified timing diagram illustrating another example TDM scheme involving more than two transceivers, according to another embodiment.

FIG. 6 is a flow diagram of an example method for using TDM to mitigate effects of crosstalk in a communication system that uses a plurality of cables, according to an embodiment.

FIG. 7 is a flow diagram of an example method for mitigating effects of crosstalk in a communication system that uses a plurality of cables, according to another embodiment.

DETAILED DESCRIPTION

Figure 1:
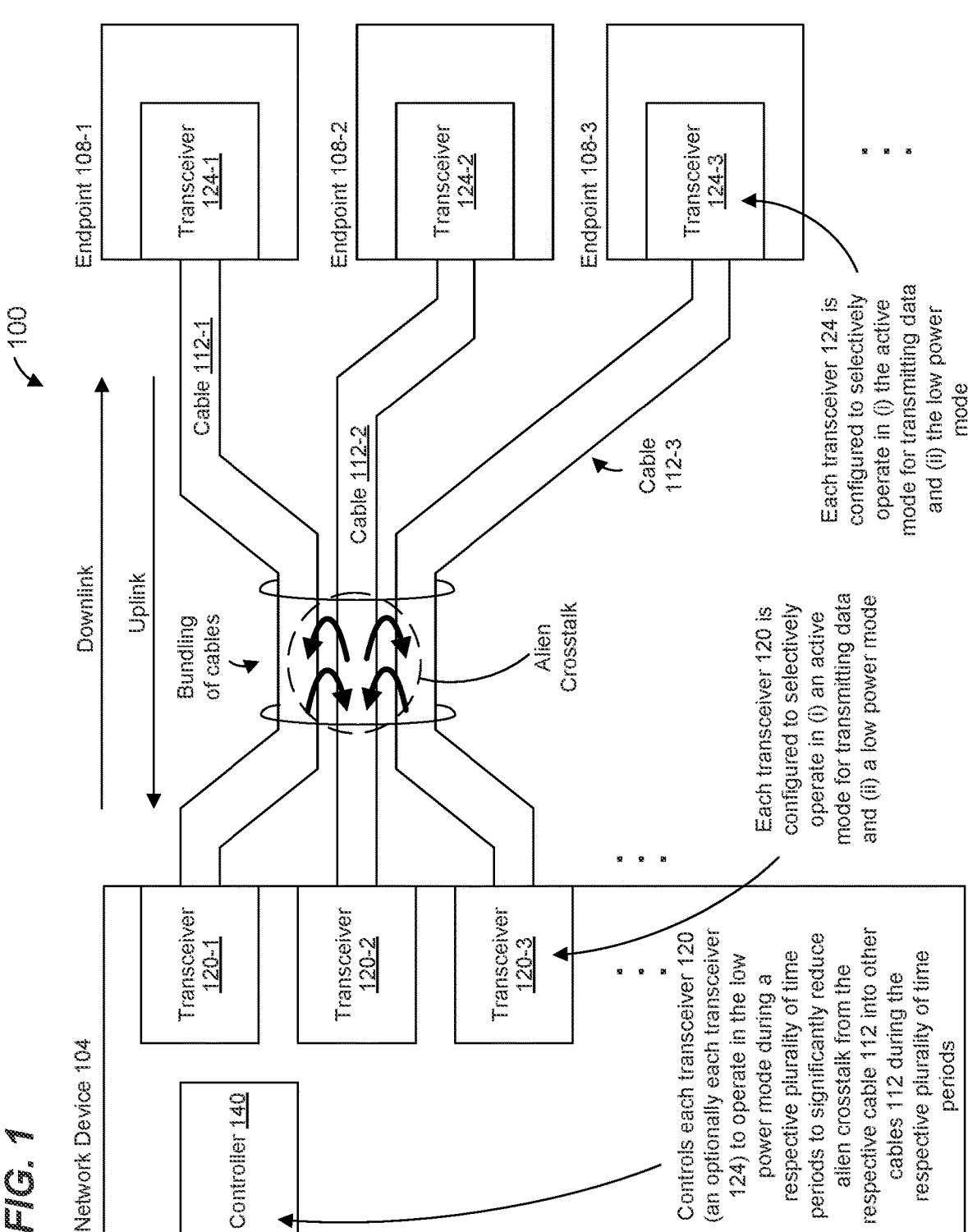
FIG. 1 is a simplified diagram of an example communication system that uses time-division multiplexing (TDM) to reduce crosstalk between cables, according to an embodiment.

As mentioned above, there is currently a large installed base 1G and slower Ethernet networks using Cat5 and Cat5e cables. However, both the need for higher data speeds and the availability of 10 gigabit per second (10G) Ethernet ports have increased significantly in recent years. Thus, the desire to upgrade existing 1 gigabit per second (1G) and slower Ethernet networks is growing. One obstacle to upgrading existing 1G and slower Ethernet networks, however, is the cost of upgrading the cabling required for 10G Ethernet. Cat6 and Cat6a cables are more expensive than Cat5 and Cat5e cables. More importantly, the cost of labor to replace Cat5 and Cat5e cables with Cat6 or Cat6a cables is significant, and the process of cable replacement likely will be very disruptive to users of an Ethernet network, workers of an office building, residents of an apartment building, etc., for example.

The present application describes embodiments of devices and methods that use time-division multiplexing (TDM) to mitigate crosstalk between existing cables (such as Cat5 and Cat5e cables, or even Cat3 cables), which may not be rated for the high speed transmissions such as 10G transmissions. For example, transmissions in a first cable are quieted during a plurality of first time periods so that the crosstalk from the first cable into a second cable during the plurality of first time periods is significantly reduced; thus, transmissions in the second cable during the plurality of first time periods proceed without significant adverse effects due to crosstalk from the first cable. Similarly, transmissions in the second cable are quieted during a plurality of second time periods, and transmissions in the first cable proceed during the plurality of second time periods. Crosstalk from the first cable into the second cable does not adversely affect data transmission in the second cable during the plurality of second time periods because data is not transmitted in the second cable during the plurality of second time periods. Additionally, because transmissions in the second cable are quieted during the plurality of second time periods, crosstalk from the second cable into the first cable during the plurality of second time periods is significantly reduced; thus, transmissions in the first cable during the plurality of second time periods proceed without significant adverse effects due to crosstalk from the second cable.

In some embodiments, a power saving mechanism, such as defined by the IEEE 802.3az Standard (sometimes referred to as "Energy Efficient Ethernet" or "EEE"), is used to quiet transmission in a cable to significantly reduce crosstalk from the cable into one or more other cables. For example, the power saving mechanism defines i) an active mode in which data transmissions via a cable proceed, and ii) a low power mode in which data transmissions are substantially quieted. In some embodiments, when transmissions in a cable are to be quieted substantially during a plurality of time periods, a communication link via the cable is put into the low power mode during the plurality of time periods. Outside of the plurality of time periods, the communication link is transitioned to the active mode in which normal data transmission can occur.

FIG. 1 is a simplified diagram of an example communication system 100, according to an embodiment. The communication system 100 includes a network device 104, such as a router, a switch, a hub, etc., communicatively coupled to a plurality of endpoint devices 108 (e.g., computers, televisions, gaming systems, medical equipment, etc.) via respective cables 112. As an illustrative example, the communication system 100 is located in an office building, and the endpoint devices 108 correspond to computers in different workstations (e.g., offices, cubicles, etc.). As another illustrative example, the communication system 100 is located in a multi-family residential building, and the endpoint devices 108 correspond to computers, televisions, gaming systems, etc., throughout the residential building. As another illustrative example, the communication system 100 is located in a healthcare facility, and the endpoint devices 108 correspond to medical equipment, computers, televisions, throughout the healthcare facility.

The network device 104 include a plurality of transceivers 120, each communicatively coupled to a respective cable 112. Similarly, each endpoint 108 includes a respective transceiver 124 communicatively coupled to a respective cable 112. Although three transceivers 120 and three endpoints 108 are illustrated in FIG. 1, the communication system 100 includes other suitable numbers of transceivers 120 and endpoints 108, such as two or more than 3. In some embodiments, a single endpoint 108 includes multiple transceivers 124 communicatively coupled to multiple respective cables 112.

One or more of the cables 112 are Class C cables (sometimes referred to as a Category 3 (Cat3) cable) or Class D cables (sometimes referred to as a Category 5e (Cat5e) cable) as specified by the ISO/IEC 11801 standard, according to an embodiment. A Class C (Cat3) cable comprises a plurality of twisted copper wire pairs and is typically rated for certain performance and test requirements up to 16 MHz. A Class D (Cat5e) cable comprises a plurality of twisted copper wire pairs and is typically rated for certain performance and test requirements up to 100 MHz. One or more of the cables 112 are Category 5 (Cat5) cables specified by an older version of the ISO/IEC 11801 standard and, like Cat5e cables, are rated for certain performance and test requirements up to 100 MHz (according to the older version of the ISO/IEC 11801 standard). Category 3 cables, Category 5 cables, and Category 5E cables are sometimes referred to herein as "legacy cables."

In comparison. Class E cables (sometimes referred to as Category 6 (Cat6) cables) as specified by the ISO/IEC 11801 standard and Class EA cables (sometimes referred to as Category 6A (Cat6A) cables) as specified by the ISO/IEC 11801 standard are rated for certain performance and test requirements up to 250 MHz and 500 MHz, respectively.

Class F cables (sometimes referred to as Category 7 (Cat7) cables) as specified by the ISO/IEC 11801 standard are rated for certain performance and test requirements up to 600 MHz. On the other hand, a legacy cable may not be rated for any performance or test requirements above 100 MHz according to the ISO/IEC 11801 standard, according to some embodiments.

In some embodiments, one or more other cables 112 are legacy cables that are not rated for any performance or test requirements above 100 MHz. In some embodiments, one or more other cables 112 are rated for performance or test requirements above 100 MHz. For example, one or more other cables 112 are Cat6, Cat6a, or Cat7 cables, according to an embodiment.

As will be described in more detail below, each transceiver 120 is configured to selectively operate in i) an active mode in which normal data transmission by the transceiver occur, and ii) a low power mode in which the transceiver 120 generally quiets transmissions. For example, when operating in the low power mode, the transceiver 120 does not transmit data that is intended for layers in a protocol stack above a media access control (MAC) layer, but transmits control signals to manage a communication link with a link partner (e.g., a respective transceiver 124), such as transmitting refresh signals periodically to maintain the communication link. In embodiments that include transmission of refresh signals during the low power mode, the refresh signals are used to maintain coefficients of one or more signal processors (e.g., an equalizer, an echo canceller, a crosstalk canceller, etc.) of the transceiver 120 (and/or the transceiver 124) and maintain synchronization during the low power mode to facilitate a rapid transition to the active mode.

In the low power mode, certain circuitry of the transceiver 120 that is not needed during the low power mode is shut down to reduce power consumption, according to some embodiments.

In some embodiments, each transceiver 120 is configured to operate according to EEE.

As illustrated in FIG. 1, at least cables 112-1, 112-2, and 112-3 are bundled together for cable management. The bundling of cables 112-1, 112-2, and 112-3 generally increases crosstalk between the cables 112-1, 112-2, and 112-3. For example, transmissions within cable 112-1 and transmissions within cable 112-3 both cause crosstalk into cable 112-2. Similarly, transmissions within cable 112-2 cause crosstalk into cable 112-1 and cable 112-3. Such crosstalk is sometimes referred to as "alien crosstalk" because the crosstalk experienced by one cable 112 is caused by transmissions in another cable 112, as opposed to crosstalk between different twisted wire pairs within a single cable 112.

In other embodiments, at least some cables 112 (e.g., at least cables 112-1, 112-2, and 112-3) are not bundled, but are otherwise deployed in an arrangement that results in alien crosstalk between cables 112. For example, cables 112 that run together in close proximity (while not being bundled with a strap or tie) for a span may experience alien crosstalk. In other embodiments, at least some alien crosstalk occurs because of close proximity between ports of the network device to which respective cables 112 are connected, as opposed to bundling of cables 112 or close proximity of cables 112.

Generally, legacy cables tend to cause and/or experience more alien crosstalk with 10G Ethernet transmissions as compared to Cat6, Cat6A, and Cat7 cables.

The largest component of alien crosstalk typically is crosstalk experienced by receive circuitry within a first transceiver (e.g., a transceiver 120 or a transceiver 124) caused by transmissions by one or more second transceivers that are located proximate to the first transceiver, sometimes referred to as "near-end alien crosstalk." For example, receive circuitry of the transceiver 120-1 experiences near-end alien crosstalk caused by transmissions by the transceiver 120-2 within the cable 112-2. As another example, receive circuitry of the transceiver 120-2 experiences near-end alien crosstalk caused by transmissions by the transceiver 120-1 within the cable 112-1 and by transmissions by the transceiver 120-3 within the cable 112-3. As another example, receive circuitry of the transceiver 120-3 experiences near-end alien crosstalk caused by the transmissions by the transceiver 120-2 within the cable 112-2. One or more of the transceivers 124 may also experience near-end alien crosstalk in some network deployments.

Another significant component of alien crosstalk is crosstalk experienced by receive circuitry within a first transceiver (e.g., a transceiver 124) connected to a first cable 112 caused by transmissions in one or more other cables 112 by one or more second transceivers (e.g., transceivers 120) that are located far from the first transceiver, sometimes referred to as "far-end alien crosstalk." For example, receive circuitry of the transceiver 124-1 experiences far-end alien crosstalk caused by transmissions by the transceiver 120-2 within the cable 112-2. As another example, receive circuitry of the transceiver 124-2 experiences far-end alien crosstalk caused by transmissions by the transceiver 120-1 within the cable 112-1 and by transmissions by the transceiver 120-3 within the cable 112-3. As another example, receive circuitry of the transceiver 124-3 experiences near-end alien crosstalk caused by the transmissions by the transceiver 120-2 within the cable 112-2. One or more of the transceivers 124 typically also experience far-end alien crosstalk, at least in some network deployments.

A Cat5e cable (or even a Cat5 cable) can be used for a 10G Ethernet link when the length of the cable is relatively short and when alien crosstalk is not an issue, such as when the cable is not bundled with any other Ethernet cables. However, in a network such as illustrated in FIG. 1 in which multiple network cables 112 are bundled, or in deployments in which alien crosstalk is otherwise significant, standard 10G Ethernet transmissions over Cat5e or Cat5 cables will typically result in alien crosstalk that significantly degrades performance. Similarly, standard 5G Ethernet transmissions over Cat5e or Cat5 cables may result in alien crosstalk that significantly degrades performance at least in some network deployments.

Alien crosstalk causes link quality degradation such as packet errors, dropping of a communication link, etc., depending on the level of alien crosstalk that is experienced.

A controller 140 is configured to control the transceivers 120 to implement TDM to mitigate alien crosstalk between the cables 112. For example, transmissions by the transceiver 120-1 are quieted during a plurality of first time periods so that the crosstalk from the cable 112-1 into one or more other cables 112 (e.g., the cable 112-2) during the plurality of first time periods is significantly reduced; thus, transmissions in one or more other cables 112 (e.g., the cable 112-2) during the plurality of first time periods proceed without significant adverse effects due to alien crosstalk from the cable 112-1. Similarly, transmissions in the cable 112-2 are quieted during a plurality of second time periods, and transmissions in one or more other cables 112 (e.g., the cable 112-1) proceed during the plurality of second time periods. Crosstalk from one or more other cables 112 (e.g., the cable 112-1) into cable 112-2 do not adversely affect data transmission in the cable 112-2 during the plurality of second time periods because data is not transmitted in the cable 112-2 during the plurality of second time periods. Additionally, because transmissions in the cable 112-2 are quieted during the plurality of second time periods, crosstalk from the cable 112-2 into the one or more other cables 112 (e.g., the cable 112-1) during the plurality of second time periods is significantly reduced; thus, transmissions in the one or more other cables (e.g., the cable 112-1) during the plurality of second time periods proceeds without significant adverse effects due to crosstalk from the cable 112-2.

Although the controller 140 is illustrated in FIG. 1 as being separate from the transceivers 120, the controller 140 is a component of one of the transceivers 120, according to another embodiment. Although the controller 140 is illustrated in FIG. 1 as being a component of the network device 104, the controller 140 is separate from but communicatively coupled to the network device 104, according to another embodiment. For example, the controller 140 is, or a component of, a standalone appliance distinct from the network device 104, in an embodiment.

In some embodiments, the controller 140 comprises a processor and a memory that stores machine readable instructions, where the processor is configured to execute machine readable instructions stored in the memory. The machine readable instructions, when executed by the processor, cause the processor to control the transceivers 120 to implement TDM as discussed above. In some embodiments, the controller 140 comprises hardware circuitry that is configured to implement TDM as discussed above.

Figure 2:
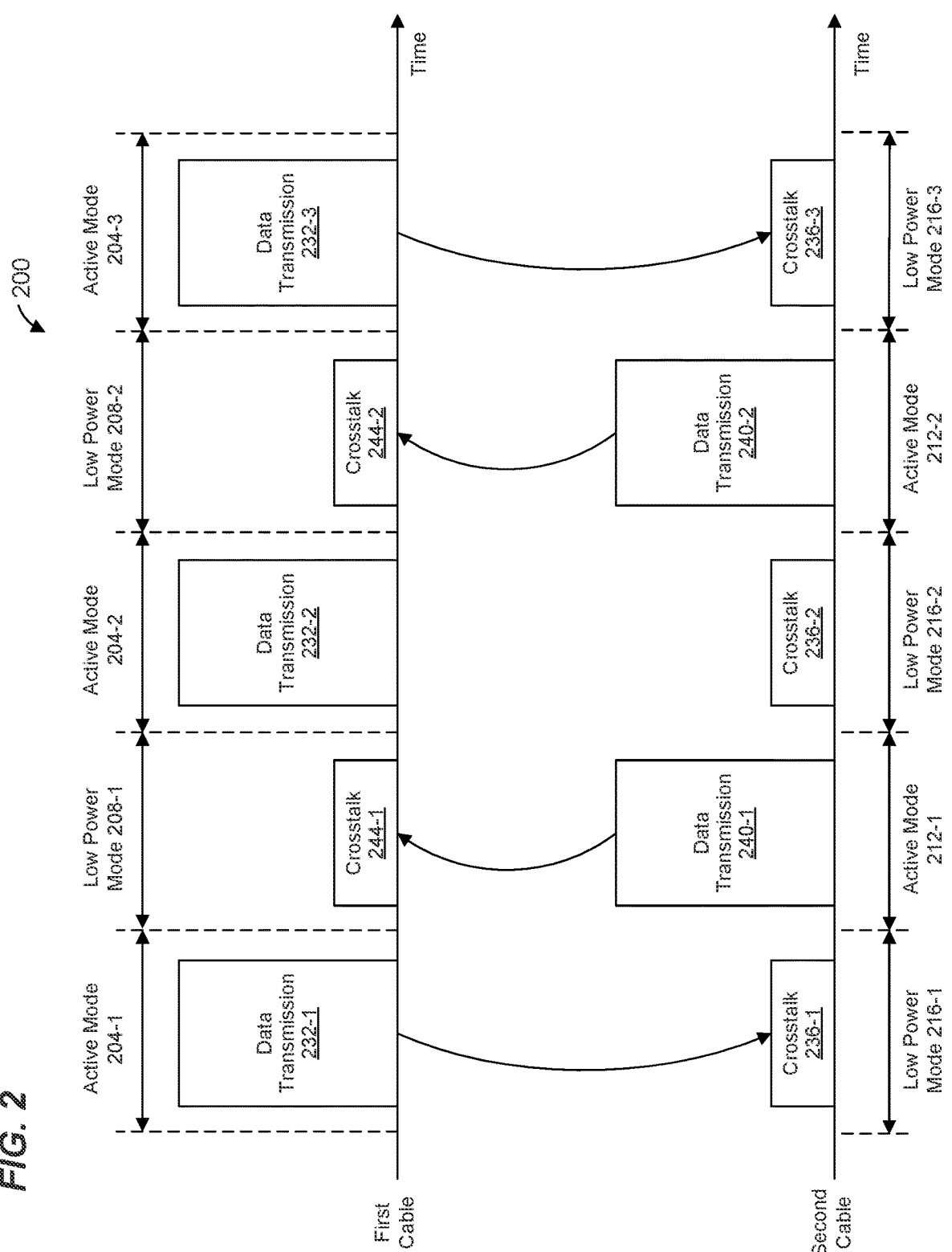
FIG. 2 is a simplified timing diagram illustrating transmissions in a first cable and a second cable according to an example TDM scheme, according to an embodiment.

FIG. 2 is a simplified timing diagram 200 illustrating transmissions in a first cable (e.g., the cable 112-1) and a second cable (e.g., the cable 112-2) according to an example TDM scheme, according to an embodiment. A first transceiver (e.g., the transceiver 120-1) that is communicatively connected to the first cable (e.g., the cable 112-1) is controlled to operate in an active mode during a plurality of first time periods 204, and is controlled to operate in a low power mode during a plurality of second time periods 208. Similarly, a second transceiver (e.g., the transceiver 120-2) that is communicatively connected to the second cable (e.g., the cable 112-2) is controlled to operate in the active mode during a plurality of third time periods 212, and is controlled to operate in the low power mode during a plurality of fourth time periods 216. In some embodiments, the low power mode corresponds to the low power mode of EEE.

During each of the first time periods 204, the first transceiver performs respective data transmissions 232, which cause respective alien crosstalk 236 in the second cable. Similarly, during each of the third time periods 212, the second transceiver performs respective data transmissions 240, which cause respective alien crosstalk 244 in the first cable.

Each first time period 204 (when the first transceiver is operating in the active mode) occurs within a corresponding fourth time period 216 when the second transceiver is operating in the low power mode. Thus, the alien crosstalk in the first cable from transmissions in the second cable is substantially reduced during the first time periods 204. Also, because the data transmissions 240 in the second cable do not occur during the first time periods 204, there are no adverse effects on the data transmissions 240 in the second cable during the first time periods 204 caused by the alien crosstalk 236 in the second cable from the data transmissions 232 in the first cable.

Similarly, each third time period 212 (when the second transceiver is operating in the active mode) occurs within a corresponding second time period 208 when the first transceiver is operating in the low power mode. Thus, alien crosstalk in the second cable from transmissions in the first cable are substantially reduced during the fourth time periods 212. Also, because the data transmissions 232 in the first cable do not occur during the fourth time periods 212, there are no adverse effects on the data transmissions 232 in the first cable during the fourth time periods 212 caused by the alien crosstalk 244 in the first cable from the data transmissions 240 in the second cable.

Although borders of the time periods 204 are illustrated in FIG. 2 as being aligned with borders of respective time periods 216, the borders of the time periods 204 are not aligned with the borders of respective time periods 216, in some embodiments. Similarly, although borders of the time periods 212 are illustrated in FIG. 2 as being aligned with borders of respective time periods 208, the borders of the time periods 212 are not aligned with the borders of respective time periods 208, in some embodiments.

FIG. 2 is a simplified illustration of a TDM scheme involving transmissions in two cables. Similar TDM schemes are employed for communication systems with more than two cables. For example, FIG. 3A is a simplified timing diagram 300 illustrating an example TDM scheme involving more than two transceivers, according to an embodiment. A time period 304 is partitioned into a plurality of fixed-length time slots 308, and the time slots 308 are assigned to respective transceivers 120 among a set of multiple transceivers 120. During each time slot 308 the associated transceiver 120 is permitted to operate in the active mode (e.g., defined by EEE), and outside each time slot 308 the associated transceiver 120 operates in the low power mode (e.g., defined by EEE). Thus, only one transceiver 120 is permitted to operate in the active mode in any one time slot 308. Because only one transceiver 120 is permitted to operate in the active mode in any one time slot 308, alien crosstalk in the cable 112 to which the transceiver 120 is communicatively connected is substantially reduced. Additionally, because other transceivers 120 are in the low power mode during the time slot 308, transmissions by the one transceiver 120 during the time slot 308 do not cause adverse effects on the data transmissions in the other cables 112.

In an embodiment, the plurality of time slots 308 correspond to a shared resource, shared by the multiple transceivers 120. The controller 140 is configured to allocate time slots 308 to transceivers 120. In some embodiments, transceivers 120 are configured to monitor an allocation of time slots 308 by the controller 140, and to request additional time slots 308 from the controller 140 when needed.

The relative amount of data that is buffered at a transceiver 120 for transmission in connection with the time period 304 (as compared to other transceivers 120 participating in the TDM scheme) is used to determine how many time slots 308 are to be associated with the transceiver 120, according to an embodiment. As another example, the relative throughput that a transceiver 120 (as compared to other transceivers 120 participating in the TDM scheme) is seeking for the time period 304 is used to determine a number of time slots 308 that are to be associated with the transceiver 120 during the time period 304, according to another embodiment.

FIG. 3B is a simplified timing diagram 350 illustrating another example TDM scheme involving more than two transceivers, according to another embodiment. A time period 354 is partitioned into a plurality of variable length time slots 358, and the time slots 358 are assigned to respective transceivers 120 among a set of multiple transceivers 120. During each time slot 358 the associated transceiver 120 is permitted to operate in the active mode (e.g., defined by EEE), and outside each time slot 358 the associated transceiver 120 operates in the low power mode (e.g., defined by EEE). Thus, only one transceiver 120 is permitted to operate in the active mode in any one time slot 358. Because only one transceiver 120 is permitted to operate in the active mode in any one time slot 358, alien crosstalk in the cable 112 to which the transceiver 120 is communicatively connected is substantially reduced. Additionally, because other transceivers 120 are in the low power mode during the time slot 358, transmissions by the one transceiver 120 during the time slot 358 do not cause adverse effects on the data transmissions in the other cables 112.

The time slots 358 are illustrated in FIG. 3B as having different durations. In an embodiment, the time period 354 corresponds to a shared resource, shared by the multiple transceivers 120. The controller 140 is configured to allocate time slots 358 of respective durations to transceivers 120. In some embodiments, transceivers 120 are configured to monitor an allocation of time slots 358 by the controller 140, and to request longer or shorter time slots 358 from the controller 140 when needed.

The relative amount of data that is buffered at a transceiver 120 for transmission in connection with the time period 354 (as compared to other transceivers 120 participating in the TDM scheme) is used to determine a length of the time slot 358, according to an embodiment. As another example, the relative throughput that a transceiver 120 (as compared to other transceivers 120 participating in the TDM scheme) is seeking for the time period 354 is used to determine a length of the time slot 358, according to another embodiment.

Figure 4:
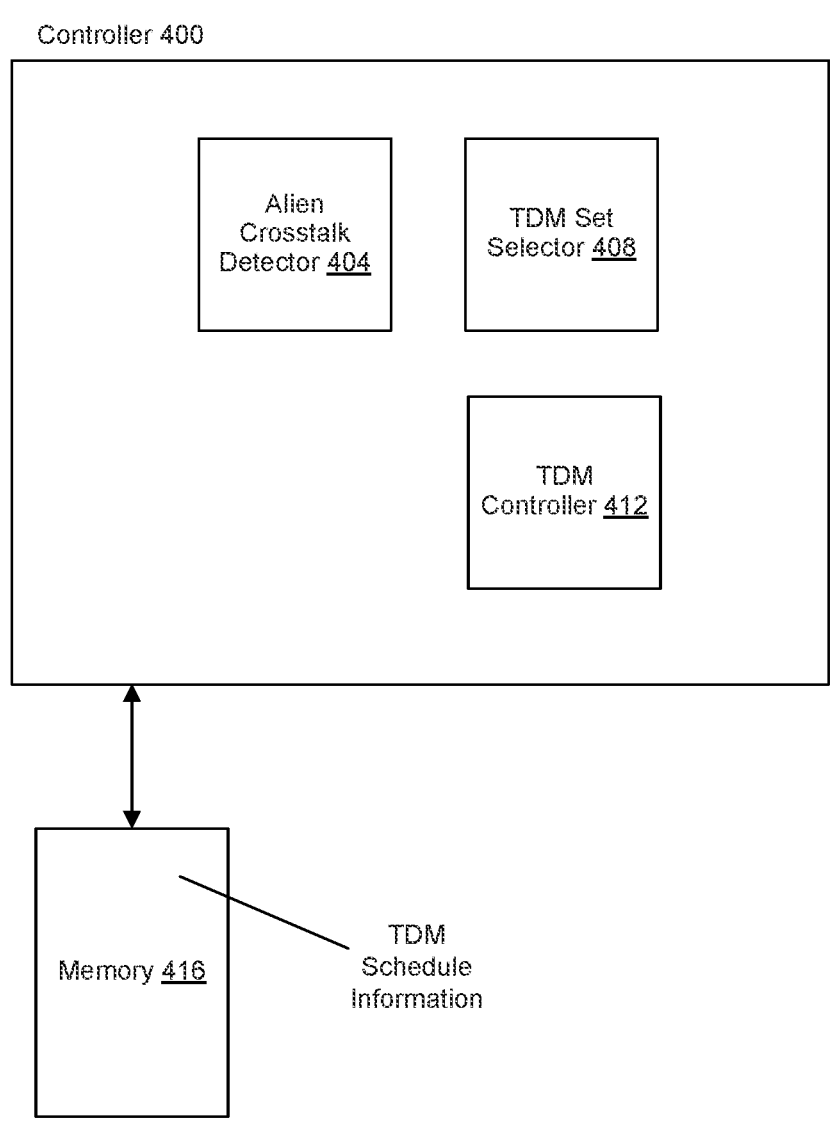
FIG. 4 is a simplified block diagram of an example controller of a network device that is configured to control a plurality of transceivers to implement TDM to mitigate alien crosstalk between the cables that are communicatively connected to the transceivers, according to an embodiment.

FIG. 4 is a simplified block diagram of a controller 400 that is configured to control a plurality of transceivers to implement TDM to mitigate alien crosstalk between the cables that are communicatively connected to the transceivers, according to an embodiment. The controller 400 is an example of the controller 140 of FIG. 1, according to an embodiment, and the controller 400 is described with reference to FIG. 1 for explanator purposes. In another embodiment, the controller 140 of FIG. 1 is a suitable controller different than the controller 400. Similarly, the controller 400 is used in a suitable communication system different than the communication system 100 of FIG. 1, in other embodiments.

The controller 400 includes an alien crosstalk detector 404 that is configured to determine whether transmissions in a respective cable 112 are causing significant alien crosstalk in the one or more other cables 112. As merely an illustrative example, the transceivers 120 report signal quality information (e.g., one or more of a bit error rate, a packet error rate, a signal-to-noise ratio (SNR), a link quality indicator (LQI), a received signal strength indicator (RSSI), a signal-to-interference-plus-noise ratio (SINR), etc.) to the controller 400, and the alien crosstalk detector 404 determines correlations between the timing of transmissions in one cable 112 with the timing of reduced signal quality (e.g., one or more of an increased bit error rate, an increased packet error rate, a decreased SNR, decreased LQI, decreased RSSI, a decreased SINR, etc.) in other cables 112, according to an embodiment. For example, a significant reduction of signal quality in a first cable when transmissions in a second cable are occurring as compared to signal quality in the first cable when transmissions in the second cable are not occurring may indicate that the second cable is causing significant alien crosstalk in the first cable. In such embodiments, the alien crosstalk detector 404 uses the correlations between the timing of transmissions in one cable 112 and the timing of reduced signal quality in one or more other cables 112 to determine whether transmissions in the one cable 112 are causing significant alien crosstalk in the one or more other cables 112. In some embodiments, when the alien crosstalk detector 404 determines that transmissions in the one cable 112 are causing significant alien crosstalk in the one or more other cables 112, the alien crosstalk detector 404 assumes the alien crosstalk is reciprocal and determines that transmissions in one or more other cables 112 are causing significant alien crosstalk in the one cable 112. In such embodiments, alien crosstalk is significant if it causes reduction in signal quality below a suitable threshold. Illustrative examples of suitable thresholds that indicate a significant reduction in signal quality include a bit error rate of increasing above 0.0001%, a packet error rate increasing above 0.0001%, a SNR decreasing below 25 dBm, etc. In other embodiments, other suitable thresholds are used.

As another example, the alien crosstalk detector 404 is configured to control first transceivers 120 and/or first transceivers 124 to quiet transmissions in one or more first cables 112 while transmissions by a second transceiver 120 in a second cable 112 proceeds, according to an embodiment. In such embodiments, the first transceivers 120 report to the controller 400 respective signal levels of alien crosstalk (e.g., interference power levels) experienced by the first transceivers 120 while transmissions in the one or more first cables 112 is quieted and the transmissions in the second cable 112 are proceeding. In such embodiments, the alien crosstalk detector 404 uses such measured levels of crosstalk to determine whether transmissions in the second cable 112 are causing significant alien crosstalk in the one or more other cables 112. In some embodiments, when the alien crosstalk detector 404 determines that transmissions in the one cable 112 are causing significant alien crosstalk in the one or more other cables 112, the alien crosstalk detector 404 assumes the alien crosstalk is reciprocal and determines that transmissions in one or more other cables 112 are causing significant alien crosstalk in the one cable 112. The alien crosstalk detector 404 determines whether a measured level of crosstalk is significant by comparing the measured level of crosstalk to a suitable threshold, according to an embodiment. In such embodiments, when the measured level of crosstalk is above the threshold, the controller 140 determines the level of crosstalk is significant.

The controller 400 also includes a TDM set selector 408 that is configured to determine a set of multiple transceivers that are to participate in a TDM scheme based on the determination (e.g., by the alien crosstalk detector 404) whether transmissions in respective cables 112 are causing alien crosstalk in respective one or more other cables 112. For example, the TDM set selector 408 is configured to select the set of multiple transceivers as transceivers 120 that are communicatively coupled to cables 112 that have been determined to be causing alien crosstalk amongst one another. In an embodiment, the TDM set selector 408 is configured to select the set of transceivers so that the set does not include transceivers that are not experiencing significant alien crosstalk caused by transceivers that are included in the set.

The controller 400 also includes a TDM controller 412 that is configured to control transceivers 120, among a set of multiple transceivers 120 (e.g., determined by the TDM set selector 408), to implement TDM to mitigate alien crosstalk between cables 112 communicatively coupled to respective transceivers 120 among the set of multiple transceivers 120. For example, the TDM controller 412 is configured to control each transceiver 120, among the set of multiple transceivers 120 (e.g., determined by the TDM set selector 408), to transition between the active mode and the low power mode according to a schedule, in an embodiment.

In an embodiment, the TDM controller 412 generates a TDM schedule and stores TDM schedule information in a memory 416 that is coupled to the controller 400 or included in the controller 400, and each transceiver 120 among the set of multiple transceivers 120 accesses the TDM schedule in the memory 416 to determine when the transceiver 120 is to operate in the active mode and when the transceiver 120 is to operate in the low power mode. In another embodiment, the TDM controller 412 uses the TDM schedule in the memory 416 to generate control signals that control each transceiver 120, among the set of multiple transceivers 120, to operate in the active mode during first time periods and to operate in the low power mode in second time periods, according to the TDM schedule.

In some embodiments, the TDM controller 412 is also configured to control transceivers 124 that correspond to a determined set of transceivers 120 (e.g., determined by the TDM set selector 408) to implement TDM to mitigate alien crosstalk between cables 112 communicatively coupled to the transceivers 124. For example, the TDM controller 412 is configured to control each transceiver 124, that corresponds to a respective transceiver 120 from the determined set of transceivers 120 to transition between the active mode and the low power mode according to a schedule, in an embodiment. In some embodiments in which the TDM controller 412 controls transceivers 124, the TDM controller 412 generates a TDM schedule for multiple transceivers 124 and sends TDM schedule information to the multiple transceivers 124, and each transceiver 124 among the multiple transceivers 124 accesses the TDM schedule information to determine when the transceiver 124 is to operate in the active mode and when the transceiver 124 is to operate in the low power mode.

In other embodiments, the TDM controller 412 does not control the transceivers 124 to implement TDM.

In some embodiments, one or more of the components of the controller 400 discussed above comprise a processor and a memory that stores machine readable instructions, where the processor is configured to execute machine readable instructions stored in the memory. The machine readable instructions, when executed by the processor, cause the processor to perform acts of the controller 400 discussed above. In some embodiments, one or more of the components of the controller 400 discussed above comprise hardware circuitry that is configured to implement acts of the controller 400 discussed above.

Figure 5:
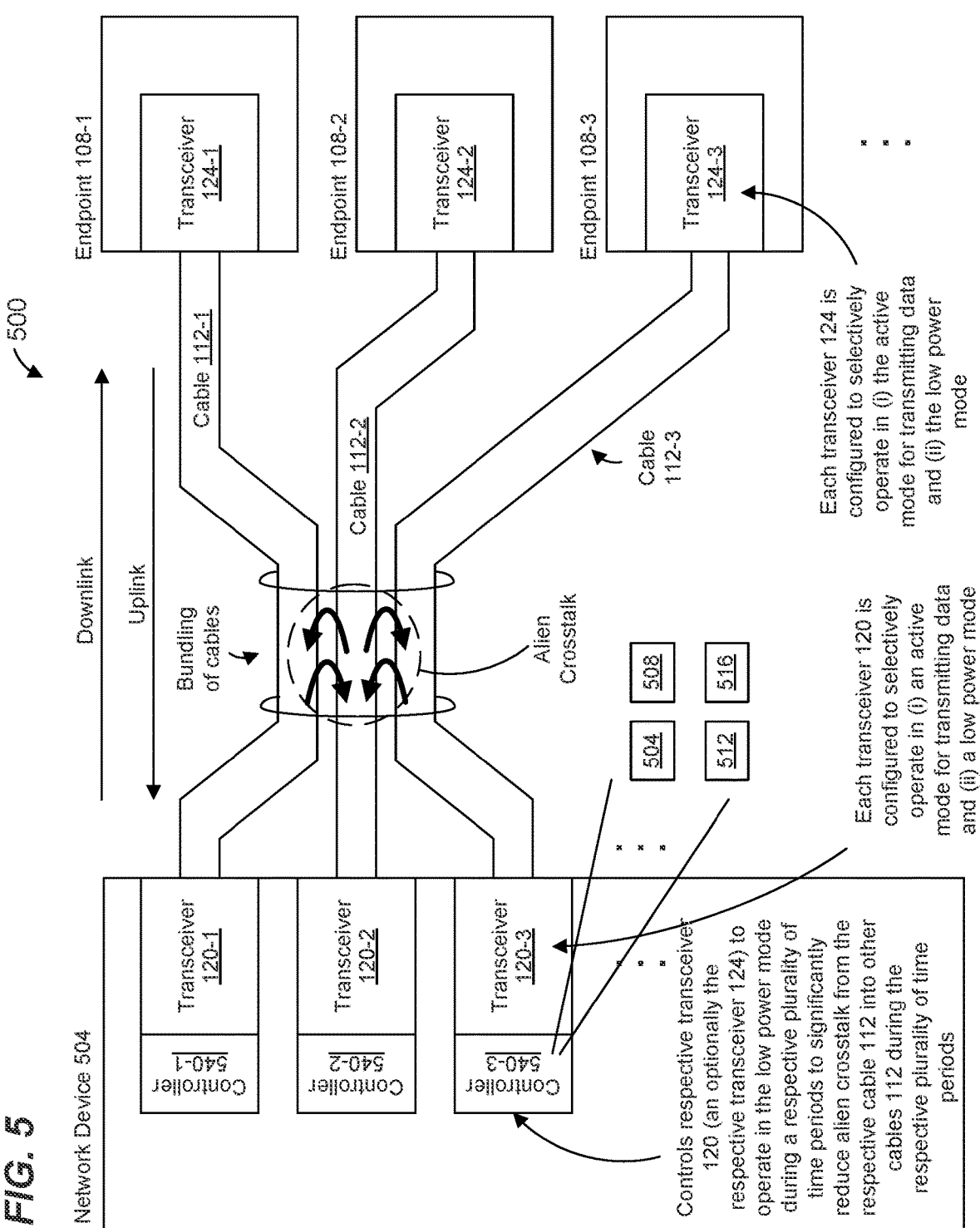
FIG. 5 is a simplified diagram of another example communication system that uses TDM to reduce crosstalk between cables, according to another embodiment.

Although FIG. 1 illustrates the controller 140 as being a component of the network device 104 that is separate from the transceivers 120, in other embodiments a controller with functionality similar to the controller 140 is a distributed controller that is distributed amongst multiple transceivers 120. FIG. 5 is a simplified block diagram of an example communication system 500 that includes a network device 504 with a distributed controller, according to an embodiment. Each transceiver 120 includes, or is coupled to, a respective controller 540, and the controllers 540 are elements of the distributed controller.

The distributed controller 540 is configured to perform actions described with reference to FIG. 4 in a distributed fashion. For example, each individual controller 540 includes an alien crosstalk detector 504 (similar to the alien crosstalk detector 404 of FIG. 4) that is configured to communicate with other controllers 540 to determine other cables 112 in which transmissions in the corresponding cable 112 is causing alien crosstalk and/or to determine other cables 112 that correspond to alien crosstalk in the corresponding cable 112, according to an embodiment. As another example, each individual controller 540 includes a TDM set selector 508 (similar to the TDM set selector 408 of FIG. 4) that is configured to communicate with other controllers 540 to determine a set of transceivers 120 with which to participate in a TDM scheme. As another example, each individual controller 540 includes a TDM controller 512 (similar to the TDM controller 412 of FIG. 4) that is configured to communicate with other controllers 540 to determine a TDM schedule according to which the corresponding transceiver 120 is to operate. As another example, each individual controller 540 includes, or is coupled to, a memory 516 (similar to the memory 416 of FIG. 4) that is configured to store TDM information corresponding to the TDM schedule according to which the corresponding transceiver 120 is to operate.

In some embodiments, one or more of the components of the controller 500 discussed above comprise a processor and a memory that stores machine readable instructions, where the processor is configured to execute machine readable instructions stored in the memory. The machine-readable instructions, when executed by the processor, cause the processor to perform acts of the controller 500 discussed above. In some embodiments, one or more of the components of the controller 500 discussed above comprise hardware circuitry that is configured to implement acts of the controller 500 discussed above.

FIG. 6 is a flow diagram of an example method 600 for mitigating effects of crosstalk in a communication system that uses a plurality of cables, according to an embodiment. The method 600 is implemented in the communication system 100 of FIG. 1, according to an embodiment. The method 600 is implemented in the communication system 500 of FIG. 5, according to another embodiment. The method 600 is described with reference to FIGS. 1 and 5 merely for explanatory purposes. In other embodiments, the method 600 is implemented in another suitable communication system different from the communication system 100 of FIG. 1 and the communication system 500 of FIG. 5.

At block 604, a first transceiver transmits data via a first cable. For example, the transceiver 120-1 (FIGS. 1, 5) transmits data via the cable 112-1.

At block 608, control circuitry associated with the first transceiver determines that transmission of the data via the first cable (block 604) is causing crosstalk in one or more second cables in the communication system. For example, the controller 400 (e.g., the alien crosstalk detector 404) determines that transmission of the data via the cable 112-1 is causing crosstalk in one or more other cables 112, according to an embodiment. As another example, the controller 540-1 (e.g., the alien crosstalk detector 504) determines that transmission of the data via the cable 112-1 is causing crosstalk in one or more other cables 112, according to another embodiment. In other embodiments, other suitable control circuitry different from the alien crosstalk detector 404 and the alien crosstalk detector 504 determines that transmission of the data via the first cable (block 604) is causing crosstalk in one or more second cables in the communication system.

In some embodiments, determining that transmission of data in the first cable is causing crosstalk in the one or more second cables at block 608 comprises determining that transmission of data in the one or more second cables is causing crosstalk in the first cable.

In an embodiment, the method 600 further comprises measuring signal quality in the one or more second cables when transmission by the first transceiver via the first cable is occurring, and determining that transmission of data in the first cable is causing crosstalk in the one or more second cables at block 608 comprises using the measured signal quality in the one or more second cables when transmission by the first transceiver via the first cable is occurring to determine that transmission of data in the first cable is causing crosstalk in the one or more second cables.

In another embodiment, measuring signal quality in the one or more second cables when transmission by the first transceiver via the first cable is occurring comprises measuring one or more respective error rates of data transmitted in the one or more second cables when transmission by the first transceiver via the first cable is occurring; and determining that transmission of data in the first cable is causing crosstalk in the one or more second cables at block 608 comprises using the one or more respective error rates of data transmitted in the one or more second cables when transmission by the first transceiver via the first cable is occurring to determine that transmission of data in the first cable is causing crosstalk in the one or more second cables.

In another embodiment, measuring signal quality in the one or more second cables when transmission by the first transceiver via the first cable is occurring comprises measuring one or more respective signal level measurements that correspond to (i) when transmission by one or more second transceivers via the one or more second cables is not occurring, and (ii) when transmission by the first transceiver via the first cable is occurring; and determining that transmission of data in the first cable is causing crosstalk in the one or more second cables at block 608 comprises using the one or more respective signal level measurements to determine that transmission of data in the first cable is causing crosstalk in the one or more second cables.

At block 612, in response to determining at block 608 that transmission of the data via the first cable is causing crosstalk in one or more second cables in the communication system, control circuitry quiets transmission by the first transceiver during a plurality of first time periods to reduce crosstalk in the one or more second cables during the plurality of first time periods. For example, the controller 400 (e.g., the TDM controller 412) quiets transmission by the first transceiver during the plurality of first time periods to reduce crosstalk in the one or more second cables during the plurality of first time periods, according to an embodiment.

As another example, the controller 540-1 (e.g., the TDM controller 512) quiets transmission by the first transceiver during the plurality of first time periods to reduce crosstalk in the one or more second cables during the plurality of first time periods, according to another embodiment.

In other embodiments, other suitable control circuitry different from the TDM controller 412 and the TDM controller 512 quiets transmission by the first transceiver during the plurality of first time periods. For example, control circuitry in the first transceiver accesses TDM schedule information to determine when transmission of the first transceiver is to be quieted, and uses the TDM schedule information to quiet transmission by the first transceiver during the plurality of first time periods.

In an embodiment, quieting transmission by the first transceiver at block 612 comprises causing, by control circuitry, the transceiver to operate in a low power mode during the plurality of first time periods. In an embodiment, the method 600 further comprises operating the first transceiver in an active mode outside of the plurality of first time periods.

In another embodiment, quieting transmission by the first transceiver at block 612 comprises: retrieving time-division multiplexing (TDM) scheduling information from a memory; and determining when the plurality of first time periods occur using the TDM scheduling information.

FIG. 7 is a flow diagram of another example method 700 for mitigating effects of crosstalk in a communication system that uses a plurality of cables, according to another embodiment. The method 700 is implemented in the communication system 100 of FIG. 1, according to an embodiment. The method 700 is implemented in the communication system 500 of FIG. 5, according to another embodiment. The method 700 is described with reference to FIGS. 1 and 5 merely for explanatory purposes. In other embodiments, the method 700 is implemented in another suitable communication system different from the communication system 100 of FIG. 1 and the communication system 500 of FIG. 5.

At block 704, a controller receives crosstalk level information from a plurality of transceivers coupled to respective cables. For example, the controller 140 (FIG. 1) receives crosstalk level information from the transceivers 120. As another example, the controller 400 (e.g., the alien crosstalk detector 404) receives crosstalk level information from the transceivers 120. As yet another example, the distributed controller 540 (FIG. 5; e.g., the alien crosstalk detector 504) receives crosstalk level information from the transceivers 120. In other embodiments, another suitable controller receives crosstalk level information from other suitable transceivers.

The crosstalk level information comprises signal quality measurement information (e.g., one or more of a bit error rate, a packet error rate, an SNR, an LQI, an RSSI, an SINR, etc.) corresponding to a cable that indicates a level of crosstalk in the cable, in some embodiments. For example, a signal quality measurement below a threshold may indicate a corresponding cable is experiencing alien crosstalk.

The crosstalk level information comprises i) signal quality measurement information (e.g., one or more of a bit error rate, a packet error rate, an SNR, an LQI, an RSSI, an SINR, etc.) corresponding to a first cable when transmissions via a second cable are quieted, and ii) signal quality measurement information corresponding to the first cable when transmissions via the second cable are occurring, in some embodiments. For example, a reduction in a signal quality measurement for the first cable, from when transmissions via the second cable are quieted to when transmissions via the second cable are occurring, above a threshold may indicate the first cable is experiencing alien crosstalk caused by the second cable.

The crosstalk level information comprises signal level measurement information (e.g., interference power level) corresponding to a cable that indicates a level of crosstalk in the cable, in some embodiments. The signal level measurement information corresponds to signal level measurement for a cable when transmissions via the cable are quieted, in some embodiments. For example, a signal level measurement above a threshold when transmissions via a corresponding cable are quieted may indicate the corresponding cable is experiencing alien crosstalk.

The crosstalk level information comprises i) signal level measurement information (e.g., interference power level) corresponding to a first cable when transmissions via a second cable are quieted, and ii) signal level measurement information corresponding to the first cable when transmissions via the second cable are occurring, in some embodiments. For example, an increase in signal level (e.g., interference power level) for the first cable, from when transmissions via the second cable are quieted to when transmissions via the second cable are occurring, above a threshold may indicate the first cable is experiencing alien crosstalk caused by the second cable.

The crosstalk level information comprises i) signal level measurement information (e.g., interference power level) corresponding to a first cable when transmissions via the first cable are quieted and when transmissions via a second cable are quieted, and ii) signal level measurement information corresponding to the first cable when transmissions via the first cable are quieted and when transmissions via the second cable are occurring, in some embodiments. For example, an increase in signal level (e.g., interference power level) for the first cable when transmissions via the first cable are quieted, from when transmissions via the second cable are quieted to when transmissions via the second cable are occurring, above a threshold may indicate the first cable is experiencing alien crosstalk caused by the second cable.

In some embodiments, the method 700 further includes the controller (e.g., the controller 140 (FIG. 1), the controller 400 (FIG. 4), the controller 540 (FIG. 5), etc.) controlling at least some transceivers to quiet transmissions via respective cables during respective first time periods and to permit transmissions via the respective cables during respective second time periods in connection with the transceivers generating the crosstalk level information received at block 704. For example, the controller i) controls one or more first transceivers to quiet transmissions during a first time period and ii) controls a second transceiver to operate in an active mode to perform transmissions during the first time period, and receives crosstalk level information (block 704) that was determined by the one or more first transceivers based on measurements made by the one or more first transceivers during the first time period, according to an embodiment. In an embodiment, the controller i) controls the second transceiver to operate in the active mode to perform transmissions during a first portion of the first time period, and ii) controls the second transceiver to quiet transmissions during a second portion of the first time period, and receives crosstalk level information (block 704) that was determined by the one or more first transceivers based on first measurements made by the one or more first transceivers during the first portion of the first time period, and second measurements made by the one or more first transceivers during the second portion of the first time period.

At least some of the transceivers are configured to selectively operate in one of (i) an active mode for transmitting data to a link partner via a respective cable and (ii) a low power mode during which the transceiver quiets transmissions to conserve power, according to some embodiments. For example, the transceiver is configured to operate according to the EEE standard, in an embodiment. In some embodiments in which the method 700 includes the controller controlling at least some transceivers to quiet transmissions via respective cables during respective first time periods and to permit transmissions via the respective cables during respective second time periods in connection with the transceivers generating the crosstalk level information received at block 704, the controller controls at least some transceivers to operate in the low power mode defined by the EEE standard during respective first time periods and to operate in the active mode defined by the EEE standard during respective second time periods in connection with the transceivers generating the crosstalk level information received at block 704.

At block 708, in response to the crosstalk level information received at block 704, the controller controls one or more transceivers to operate in a low power mode during respective time periods to reduce crosstalk in one or more cables respectively coupled to one or more other transceivers. For example, the controller 140 (FIG. 1) controls one or more transceivers 120 to operate in the low power mode at block 708. As another example, the controller 400 (e.g., the TDM controller 412) controls one or more transceivers 120 to operate in the low power mode at block 708. As yet another example, the distributed controller 540 (FIG. 5; e.g., the TDM controller 512) controls one or more 120 transceivers to operate in the low power mode at block 708. In other embodiments, another suitable controller controls one or more transceivers to operate in the low power mode at block 708.

In some embodiments, block 708 comprises determining whether transmissions in a respective cable are causing significant alien crosstalk in one or more other cables using the crosstalk level information received at block 704. For example, the controller 140 (FIG. 1) determines whether transmissions in a respective cable 112 are causing significant alien crosstalk in one or more other cables 112 using the crosstalk level information received at block 704. As another example, the controller 400 (e.g., the alien crosstalk detector 404) determines whether transmissions in a respective cable 112 are causing significant alien crosstalk in one or more other cables 112 using the crosstalk level information received at block 704. As another example, the controller 500 (e.g., the alien crosstalk detector 504) determines whether transmissions in a respective cable 112 are causing significant alien crosstalk in one or more other cables 112 using the crosstalk level information received at block 704.

In some embodiments, block 708 comprises determining a set of multiple transceivers that are to participate in a TDM scheme based on a determination of whether transmissions in respective cables 112 are causing alien crosstalk in respective one or more other cables 112. For example, the controller 140 (FIG. 1) determines the set of multiple transceivers that are to participate in a TDM scheme. As another example, the controller 400 (e.g., the TDM set selector 408) determines the set of multiple transceivers that are to participate in a TDM scheme. As another example, the controller 500 (e.g., the TDM set selector 508) determines the set of multiple transceivers that are to participate in a TDM scheme.

For example, the TDM set selector 408 is configured to select the set of multiple transceivers as transceivers 120 that are communicatively coupled to cables 112 that have been determined to be causing alien crosstalk amongst one another. In an embodiment, the TDM set selector 408 is configured to select the set of transceivers so that the set does not include transceivers that are not experiencing significant alien crosstalk caused by transceivers that are included in the set.

In some embodiments, block 708 comprises the controller generating TDM scheduling information that indicates i) respective first time periods during which the one or more transceivers operate in the low power mode and ii) respective second time periods during which the one or more transceivers operate in an active mode. In some such embodiments, each transceiver accesses the TDM scheduling information and selectively operates in the active mode and the low power mode according to the TDM scheduling information. In other such embodiments, the controller generates control signals according to the TDM scheduling information, the control signals controlling each transceiver to selectively operate in the active mode and the low power mode according to the TDM scheduling information. In an embodiment, the controller 140 generates the TDM scheduling information. In another embodiment, the controller 400 (e.g., the TDM controller 412) generates the TDM scheduling information. In another embodiment, the controller 540 (e.g., the TDM controller 512) generates the TDM scheduling information.

In a communication system similar to the communication system 500 of FIG. 5 in which each transceiver includes, or is associated with, a respective controller, the controllers do not utilize a predetermined TDM schedule to determine when respective transceivers are to transmit and when the respective transceivers are to quiet transmissions. Rather, each controller independently determines when the respective transceiver is to transmit and when the respective transceiver is to quiet transmissions, according to some embodiments. For example, each controller independently determines when the respective transceiver is to transmit and when the respective transceiver is to quiet transmissions using a technique similar to the technique illustrated in FIG. 8, or another suitable technique. In some such embodiments, each controller omits a TDM set selector 508, a TDM controller 512, and/or the memory 516 storing TDM schedule information.

Figure 8:
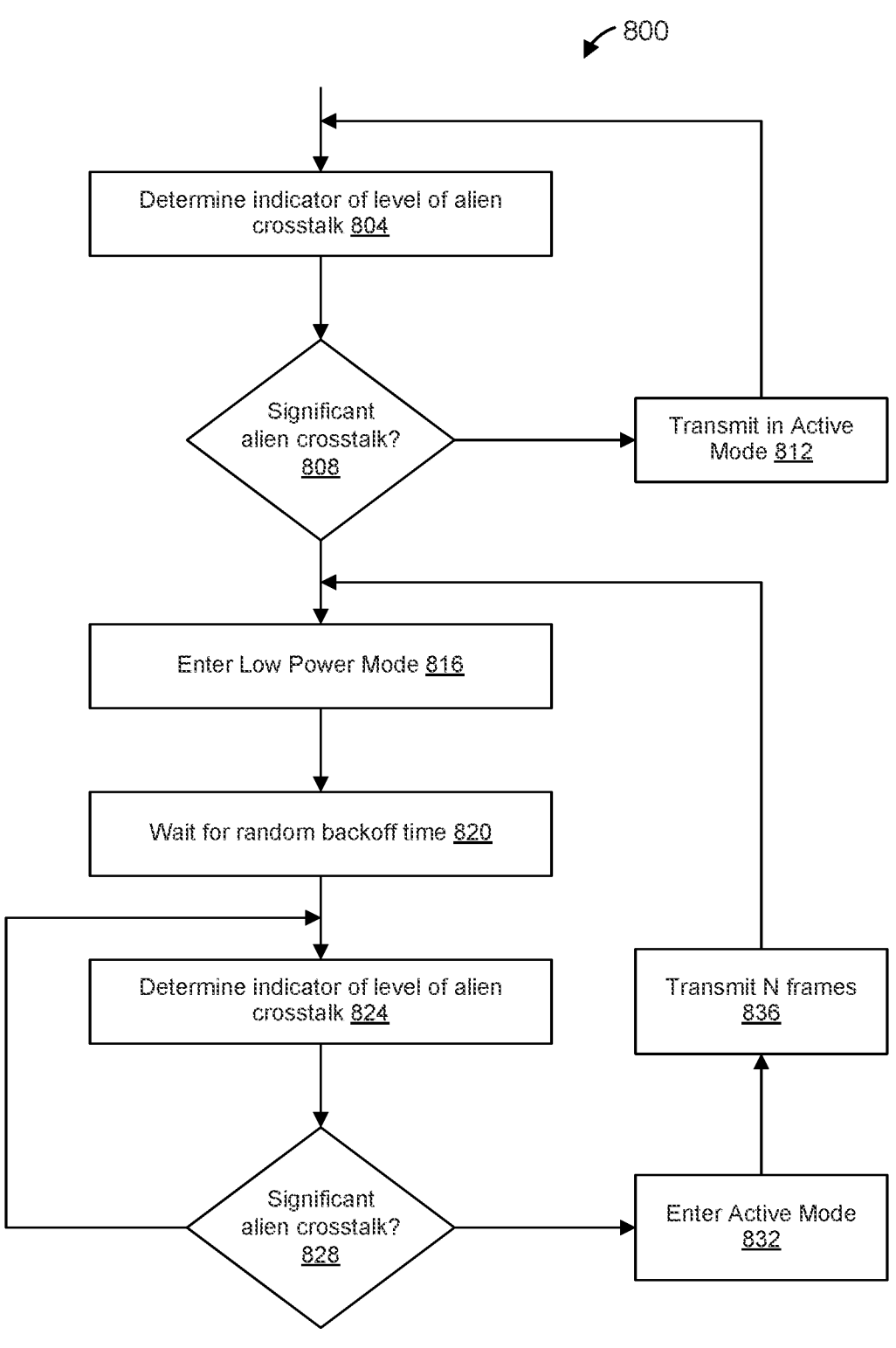
FIG. 8 is a flow diagram of another example method for mitigating effects of crosstalk in a communication system that uses a plurality of cables, according to another embodiment.

FIG. 8 is a flow diagram of another example method 800 for mitigating effects of crosstalk in a communication system that uses a plurality of cables, according to another embodiment. The method 800 is implemented in a communication system similar to the communication system 500 of FIG. 5 in which each transceiver includes, or is associated with, a respective controller, according to another embodiment. In some embodiments, the controller included in or associated with the transceiver includes an alien crosstalk detector the same as or similar to the alien crosstalk detector 504 of FIG. 5. In some such embodiments, the controller omits a TDM set selector 508, a TDM controller 512, and/or the memory 516 storing TDM schedule information.

At block 804, the controller included in or associated with the transceiver determines an indicator of a level of alien crosstalk level in a cable coupled to the transceiver. For example, the controller 540-1 (FIG. 5; e.g., the alien crosstalk detector 504) determines an indicator of a level of alien crosstalk in the cable 112-1. In other embodiments, another suitable controller determines the indicator of the level of alien crosstalk level in the cable coupled to the transceiver.

The indicator of the level of alien crosstalk comprises signal quality measurement information (e.g., one or more of a bit error rate, a packet error rate, an SNR, an LQI, an RSSI, an SINR, etc.) corresponding to the cable that indicates a level of crosstalk in the cable, in some embodiments. For example, a signal quality measurement below a threshold may indicate a corresponding cable is experiencing alien crosstalk.

The indicator of the level of alien crosstalk comprises signal level measurement information (e.g., interference power level) corresponding to the cable that indicates a level of crosstalk in the cable, in some embodiments. The signal level measurement information corresponds to signal level measurement for a cable when transmissions via the cable are quieted, in some embodiments. For example, a signal level measurement above a threshold when transmissions via the cable are quieted may indicate the cable is experiencing alien crosstalk.

At block 808, the controller included in or associated with the transceiver uses the indicator of the level of alien crosstalk determined at block 804 to determine whether the level of alien crosstalk in the cable is significant. For example, the controller 540-1 (FIG. 5; e.g., the alien crosstalk detector 504) uses the indicator of the level of alien crosstalk determined at block 804 to determine whether the level of alien crosstalk in the cable 112-1 is significant. In other embodiments, another suitable controller uses the indicator of the level of alien crosstalk determined at block 804 to determine whether the level of alien crosstalk in the cable is significant.

Determining whether the level of alien crosstalk in the cable is significant comprises comparing the indicator of the level of alien crosstalk (block 804) to a threshold. For example, a signal quality measurement falling below the threshold may indicate a corresponding cable is experiencing alien crosstalk. As another example, a signal level measurement above a threshold when transmissions via the cable are quieted may indicate the cable is experiencing alien crosstalk.

In response to determining at block 808 that the level of alien crosstalk is not significant, the flow proceeds to block 812. At block 812, the controller included in or associated with the transceiver controls the transceiver to operate in an active mode in which data transmissions via the cable proceed. In an embodiment, the controller controls the transceiver to operate in the active mode defined by the EEE standard.

On the other hand, in response to determining at block 808 that the level of alien crosstalk is significant, the flow proceeds to block 816. At block 816, the controller included in or associated with the transceiver controls the transceiver to enter a low power mode in which data transmissions by the transceiver are substantially quieted.

At block 820, the controller included in or associated with the transceiver waits for a random (or pseudorandom) back-off time period. For example, the controller randomly (or pseudorandomly) determines a time period, and then waits for the determined time period.

At block 824, after waiting the randomly (or pseudorandomly) determined backoff time period, the controller determines an indicator of a level of alien crosstalk while transmissions by the transceiver are substantially quieted. For example, the controller 540-1 (FIG. 5; e.g., the alien crosstalk detector 504) determines an indicator of a level of alien crosstalk in the cable 112-1. In other embodiments, another suitable controller determines the indicator of the level of alien crosstalk level in the cable coupled to the transceiver.

The indicator of the level of alien crosstalk comprises signal level measurement information (e.g., interference power level) corresponding to the cable that indicates a level of crosstalk in the cable, in some embodiments. The signal level measurement information corresponds to signal level measurement for a cable when transmissions via the cable are quieted, in some embodiments. For example, a signal level measurement above a threshold when transmissions via the cable are quieted may indicate the cable is experiencing alien crosstalk.

At block 828, the controller included in or associated with the transceiver uses the indicator of the level of alien crosstalk determined at block 824 to determine whether the level of alien crosstalk in the cable is significant. For example, the controller 540-1 (FIG. 5; e.g., the alien crosstalk detector 504) uses the indicator of the level of alien crosstalk determined at block 824 to determine whether the level of alien crosstalk in the cable 112-1 is significant. In other embodiments, another suitable controller uses the indicator of the level of alien crosstalk determined at block 824 to determine whether the level of alien crosstalk in the cable is significant.

Determining whether the level of alien crosstalk in the cable is significant comprises comparing the indicator of the level of alien crosstalk (block 824) to a threshold. For example, a signal level measurement above a threshold when transmissions via the cable are quieted may indicate the cable is experiencing alien crosstalk.

In response to determining at block 828 that the level of alien crosstalk is significant, the flow proceeds back to block 824, at which a new indicator of the level of alien crosstalk in the cable is determined.

On the other hand, in response to determining at block 828 that the level of alien crosstalk is not significant, the flow proceeds to block 832. At block 832, the controller included in or associated with the transceiver controls the transceiver to enter in the active mode. In an embodiment, the controller controls the transceiver to operate in the active mode defined by the EEE standard.

At block 836, the controller included in or associated with the transceiver controls the transceiver to transmit N frames while in the active mode, where N is a suitable positive integer. After transmitting the N frames at block 836, the flow proceeds back to block 816, at which the controller included in or associated with the transceiver controls the transceiver to enter the low power mode.

Figure 9:
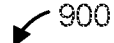
FIG. 9 is a flow diagram of another example method for mitigating effects of crosstalk in a communication system that uses a plurality of cables, according to another embodiment.

FIG. 9 is a flow diagram of another example method 900 for mitigating effects of crosstalk in a communication system that uses a plurality of cables, according to another embodiment. The method 900 is implemented in a communication system similar to the communication system 500 of FIG. 5 in which each transceiver includes, or is associated with, a respective controller, according to another embodiment. In some embodiments, the controller included in or associated with the transceiver includes an alien crosstalk detector the same as or similar to the alien crosstalk detector 504 of FIG. 5. In some such embodiments, the controller omits a TDM set selector 508, a TDM controller 512, and/or the memory 516 storing TDM schedule information.

At block 904, control circuitry associated with a transceiver determines whether alien crosstalk is occurring in a cable coupled to the transceiver. For example, the controller 540-1 (FIG. 5; e.g., the alien crosstalk detector 504) determines whether alien crosstalk is occurring in a cable coupled to the transceiver.

In an embodiment, the method 900 further comprises measuring signal quality in the cable when transmission by the transceiver via the cable is occurring, and determining whether alien crosstalk is occurring in the cable comprises using the measured signal quality to determine whether alien crosstalk is occurring in the cable.

In another embodiment, measuring signal quality in the cable when transmission by the transceiver via the cable is occurring comprises measuring an error rate of data transmitted in the cable when transmission by the transceiver via the cable is occurring; and determining whether alien crosstalk is occurring in the cable comprises using the error rate to determine whether alien crosstalk is occurring in the cable.

In another embodiment, the method 900 further comprises measuring a signal level in the cable when transmissions via the cable are quieted, and determining whether alien crosstalk is occurring in the cable comprises using the measured signal level to determine whether alien crosstalk is occurring in the cable.

At block 908, in response to determining at block 904 that alien crosstalk is occurring in the cable, control circuitry quiets transmission by the transceiver during a first time period. In an embodiment, quieting transmission by the transceiver during the first time period at block 908 comprises controlling the transceiver to operate in a low power mode during the first time period. In an embodiment, quieting transmission by the transceiver during the first time period at block 908 comprises controlling the transceiver to operate in a low power mode defined by the EEE standard during the first time period.

At block 912, in response to determining at block 904 that alien crosstalk is not occurring in the cable, control circuitry controls the transceiver to transmit data via the cable during a second time period. In an embodiment, transmit data via the cable during a second time period at block 912 comprises controlling the transceiver to operate in an active mode during the second time period. In an embodiment, transmit data via the cable during a second time period at block 912 comprises controlling the transceiver to operate in an active mode defined by the EEE standard during the second time period.

Embodiment 1: A first communication device in a wired communication network, the first communication device comprising: a first transceiver configured to transmit data via a first cable among a plurality of cables in the wired communication network, and to selectively operate in one of (i) an active mode for transmitting data to a second communication device via the first cable and (ii) a low power mode during which the first transceiver quiets transmissions to conserve power; a crosstalk detector that is configured to determine that transmission of data in the first cable is causing crosstalk in one or more second cables among the plurality of cables; and a controller that is configured to, in response to the crosstalk detector determining that transmission of the data in the first cable is causing crosstalk in one or more second cables, control the first transceiver to operate in the low power mode during a plurality of first time periods to reduce crosstalk in the one or more second cables during the plurality of first time periods.

Embodiment 2: The first communication device of embodiment 1, wherein the crosstalk detector is configured to: receive one or more respective signal quality measurements that correspond to (i) the respective one or more second cables, and (ii) when transmission by the first transceiver via the first cable is occurring; and determine that transmission of data in the first cable is causing crosstalk in the one or more second cables based on the one or more respective signal quality measurements.

Embodiment 3: The first communication device of embodiment 2, wherein the crosstalk detector is configured to: receive one or more respective error rates of data transmitted in the one or more second cables when transmission by the first transceiver via the first cable is occurring; and determine that transmission of data in the one or more second cables are causing crosstalk in the first cable based on the one or more respective error rates of data transmitted in the one or more second cables when transmission by the first transceiver via the first cable is occurring.

Embodiment 4: The first communication device of either of embodiments 2 or 3, wherein the crosstalk detector is configured to: receive one or more respective signal level measurements that correspond to (i) when transmission by one or more second transceivers via the one or more second cables is not occurring, and (ii) when transmission by the first transceiver via the first cable is occurring; and determine that transmission of data in the first cable is causing crosstalk in the one or more second cables based on the one or more respective signal level measurements.

Embodiment 5: The first communication device of any of embodiments 1-4, wherein the crosstalk detector is configured to: determine that transmission of data in the one or more second cables are causing crosstalk in the first cable; and determine that transmission of data in the first cable is causing crosstalk in the one or more second cables based on determining that transmission of data in the one or more second cables is causing crosstalk in the first cable.

Embodiment 6: The first communication device of any of embodiments 1-5, wherein the controller is configured to: control the first transceiver to operate in the active mode outside of the plurality of first time periods.

Embodiment 7: The first communication device of any of embodiments 1-6, wherein the controller is configured to: retrieve time-division multiplexing (TDM) scheduling information from a memory; and determine when the plurality of first time periods occur using the TDM scheduling information.

Embodiment 8: A method for mitigating effects of crosstalk in a wire communication network, the method comprising: transmitting, by a first transceiver of a first network device, data via a first cable among a plurality of cables; determining, at circuitry associated with the first transceiver, that transmission of data in the first cable is causing crosstalk in one or more second cables among the plurality of cables; and in response to determining that transmission of the data in the first cable is causing crosstalk in one or more second cables, quieting transmission by the first transceiver via the first cable during a plurality of first time periods to reduce crosstalk in the one or more second cables during the plurality of first time periods.

Embodiment 9: The method for mitigating effects of crosstalk of embodiment 8, further comprising: measuring signal quality in the one or more second cables when transmission by the first transceiver via the first cable is occurring; wherein determining that transmission of data in the first cable is causing crosstalk in the one or more second cables is based on measurements of signal quality in the one or more second cables when transmission by the first transceiver via the first cable is occurring.

Embodiment 10: The method for mitigating effects of crosstalk of embodiment 9, wherein: measuring signal quality in the one or more second cables when transmission by the first transceiver via the first cable is occurring comprises measuring one or more respective error rates of data transmitted in the one or more second cables when transmission by the first transceiver via the first cable is occurring; and determining that transmission of data in the one or more second cables is causing crosstalk in the first cable is based on the one or more respective error rates of data transmitted in the one or more second cables when transmission by the first transceiver via the first cable is occurring.

Embodiment 11: The method for mitigating effects of crosstalk of either of embodiments 9 or 10, wherein: measuring signal quality in the one or more second cables when transmission by the first transceiver via the first cable is occurring comprises measuring one or more respective signal level measurements that correspond to (i) when transmission by one or more second transceivers via the one or more second cables is not occurring, and (ii) when transmission by the first transceiver via the first cable is occurring; and determining that transmission of data in the one or more second cables is causing crosstalk in the first cable is based on the one or more respective signal level measurements.

Embodiment 12: The method for mitigating effects of crosstalk of any of embodiments 8-11, wherein determining that transmission of data in the first cable is causing crosstalk in the one or more second cables comprises determining that transmission of data in the one or more second cables is causing crosstalk in the first cable.

Embodiment 13: The method for mitigating effects of crosstalk of any of embodiments 8-12, wherein: quieting transmission by the first transceiver via the first cable during the plurality of first time periods to reduce crosstalk in the one or more second cables during the plurality of first time periods comprises causing, by control circuitry, the transceiver to operate in a low power mode during the plurality of first time periods; and the method further comprises operating the first transceiver in an active mode outside of the plurality of first time periods.

Embodiment 14: The method for mitigating effects of crosstalk method of any of embodiments 8-13, wherein quieting transmission by the first transceiver via the first cable during the plurality of first time periods to reduce crosstalk in the one or more second cables during the plurality of first time periods comprises: retrieving time-division multiplexing (TDM) scheduling information from a memory; and determining when the plurality of first time periods occur using the TDM scheduling information.

Embodiment 15: A communication device in a wired communication network, the communication device comprising: a plurality of transceivers, each transceiver being configured to transmit data via a respective cable among a plurality of cables in the wired communication network, and to selectively operate in one of (i) an active mode for transmitting data to a respective link partner via the respective cable and (ii) a low power mode during which the respective transceiver quiets transmissions to conserve power; and a controller that is configured to: receive crosstalk level information from the plurality of transceivers, the crosstalk level information indicating respective levels of alien crosstalk in respective cables among the plurality of cables, and in response to the crosstalk level information, control one or more transceivers among the plurality of transceivers to operate in a low power mode during respective time periods to reduce crosstalk in one or more cables respectively coupled to one or more other transceivers.

Embodiment 16: The communication device of embodiment 15, wherein the controller comprises a crosstalk detector that is configured to: receive a signal quality measurement regarding data transmitted in a first cable among the plurality of cables when transmission in a second cable among the plurality of cables is occurring; and determine that transmission of data in the second cable is causing crosstalk in the first cable based on the signal quality measurement.

Embodiment 17: The communication device of embodiment 16, wherein the crosstalk detector is configured to: receive an error rate measurement regarding data transmitted in the first cable when transmission in the second cable is occurring; and determine that transmission of data in the second cable is causing crosstalk in the first cable based on the error rate measurement.

Embodiment 18: The communication device of either of embodiments 16 or 17, wherein the crosstalk detector is configured to: receive a signal level measurement that corresponds to (i) when transmission in the first cable is not occurring, and (ii) when transmission in the second cable is occurring; and determine that transmission of data in the second cable is causing crosstalk in the first cable based on the signal level measurement.

Embodiment 19: The communication device of any of embodiments 15-18, wherein the controller comprises a crosstalk detector that is configured to: determine that transmission of data in a first cable among the plurality of dabbles is causing crosstalk in a second cable among the plurality of cables; and determine that transmission of data in the second cable is causing crosstalk in the first cable based on determining that transmission of data in the first cable is causing crosstalk in the second cable.

Embodiment 20: The communication device of any of embodiments 15-20, wherein the controller is configured to: retrieve time-division multiplexing (TDM) scheduling information from a memory; and determine the respective time periods during which the one or more transceivers are to operate in the low power mode using the TDM scheduling information.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory coupled to the processor, such as a RAM, a ROM, a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A first communication device in a wired communication network, the first communication device comprising:

a first transceiver configured to transmit data via a first cable among a plurality of cables in the wired communication network, and to selectively operate according to a power saving mechanism that defines (i) an active mode for transmitting data and (ii) a low power mode defined by the power saving mechanism during which transmissions are quieted to conserve power;

a second transceiver configured to transmit data via a second cable among the plurality of cables in the wired communication network, and to selectively operate according to the power saving mechanism that defines (i) the active mode and (ii) the low power mode;

a crosstalk detector that is configured to determine that transmission of data in the first cable is causing crosstalk in the second cable; and a controller that is configured to, in response to the crosstalk detector determining that transmission of the data in the first cable is causing crosstalk in the second cable:

control the first transceiver to operate in the low power mode defined by the power saving mechanism during a plurality of first time periods to reduce crosstalk in the second cable during the plurality of first time periods, and control the second transceiver to operate according to the power saving mechanism to restrict, to the plurality of first time periods, transmission of data via the second cable.

2. The first communication device of claim 1, wherein the crosstalk detector is configured to:

receive one or more signal quality measurements that correspond to (i) the second cable, and (ii) when transmission by the first transceiver via the first cable is occurring; and determine that transmission of data in the first cable is causing crosstalk in the second cable based on the one or more signal quality measurements.

3. The first communication device of claim 2, wherein the crosstalk detector is configured to:

receive one or more error rates of data transmitted in the second cable when transmission by the first transceiver via the first cable is occurring; and determine that transmission of data in the first cable is causing crosstalk in the second cable based on the one or more error rates of data transmitted in the second cable when transmission by the first transceiver via the first cable is occurring.

4. The first communication device of claim 2, wherein the crosstalk detector is configured to:

receive one or more signal level measurements that correspond to (i) when transmission by the second transceiver via the second cable is not occurring, and (ii) when transmission by the first transceiver via the first cable is occurring; and determine that transmission of data in the first cable is causing crosstalk in the second cable based on the one or more signal level measurements.

5. The first communication device of claim 1, wherein the crosstalk detector is configured to:

determine that transmission of data in the second cable is causing crosstalk in the first cable; and determine that transmission of data in the first cable is causing crosstalk in the second cable based on determining that transmission of data in the second cable is causing crosstalk in the first cable.

6. The first communication device of claim 1, wherein the controller is configured to:

control the first transceiver to operate in the active mode defined by the power saving mechanism outside of the plurality of first time periods.

7. The first communication device of claim 1, wherein the controller is configured to:

retrieve time-division multiplexing (TDM) scheduling information from a memory; and determine when the plurality of first time periods occur using the TDM scheduling information.

8. The communication device of claim 1, wherein the controller is further configured to, in response to the crosstalk detector determining that transmission of the data in the first cable is causing crosstalk in the second cable:

control the second transceiver to operate in the low power mode defined by the power saving mechanism during a plurality of second time periods that are different than the plurality of first time periods, and control the first transceiver to operate in the active mode defined by the power saving mechanism during the plurality of second time periods.

9. A method for mitigating effects of crosstalk in a wire communication network, the method comprising:

transmitting, by a first transceiver of a first network device, data via a first cable among a plurality of cables;

transmitting, by a second transceiver of the first network device, data via a second cable among the plurality of cables;

determining, at circuitry associated with the first transceiver, that transmission of data in the first cable is causing crosstalk in the second cable; and in response to determining that transmission of the data in the first cable is causing crosstalk in the second cable, entering, with respect to the first transceiver, a low power mode defined by a power saving mechanism to quiet transmission by the first transceiver via the first cable during a plurality of first time periods to reduce crosstalk in the second cable during the plurality of first time periods; and in response to determining that transmission of the data in the first cable is causing crosstalk in the second cable, using the power saving mechanism, with respect to the second transceiver, to restrict, to the plurality of first time periods, transmission of data by the second transceiver via the second cable.

10. The method for mitigating effects of crosstalk of claim 9, further comprising:

measuring signal quality in the second cable when transmission by the first transceiver via the first cable is occurring;

wherein determining that transmission of data in the first cable is causing crosstalk in the second cable is based on measurements of signal quality in the second cable when transmission by the first transceiver via the first cable is occurring.

11. The method for mitigating effects of crosstalk of claim 10, wherein:

measuring signal quality in the second cable when transmission by the first transceiver via the first cable is occurring comprises measuring one or more error rates of data transmitted in the second cable when transmission by the first transceiver via the first cable is occurring; and determining that transmission of data in the first cable is causing crosstalk in the second cable is based on the one or more error rates of data transmitted in the second cable when transmission by the first transceiver via the first cable is occurring.

12. The method for mitigating effects of crosstalk of claim 10, wherein:

measuring signal quality in the second cable when transmission by the first transceiver via the first cable is occurring comprises measuring one or more signal level measurements that correspond to (i) when transmission by the second transceiver via the second cable is not occurring, and (ii) when transmission by the first transceiver via the first cable is occurring; and determining that transmission of data in the first cable is causing crosstalk in the second cable is based on the one or more signal level measurements.

13. The method for mitigating effects of crosstalk of claim 9, wherein determining that transmission of data in the first cable is causing crosstalk in the second cable comprises determining that transmission of data in the second cable is causing crosstalk in the first cable.

14. The method for mitigating effects of crosstalk of claim 9, wherein:

entering, with respect to the first transceiver, the low power mode defined by the power saving mechanism to quiet transmission by the first transceiver via the first cable during the plurality of first time periods to reduce crosstalk in the one or more second cables during the plurality of first time periods comprises causing, by control circuitry, the first transceiver to operate in the low power mode defined by the power saving mechanism during the plurality of first time periods; and the method further comprises operating the first transceiver in an active mode defined by the power saving mechanism outside of the plurality of first time periods.

15. The method for mitigating effects of crosstalk method of claim 9, wherein quieting transmission by the first transceiver via the first cable during the plurality of first time periods to reduce crosstalk in the second cable during the plurality of first time periods comprises:

retrieving time-division multiplexing (TDM) scheduling information from a memory; and determining when the plurality of first time periods occur using the TDM scheduling information.

16. The method for mitigating effects of crosstalk of claim 9, further comprising:

in response to determining that transmission of the data in the first cable is causing crosstalk in the second cable, entering, with respect to the second transceiver, the low power mode defined by the power saving mechanism to quiet transmission by the second transceiver via the second cable during a plurality of second time periods that are different than the plurality of first time periods; and in response to determining that transmission of the data in the first cable is causing crosstalk in the second cable, entering, with respect to the first transceiver, the active mode defined by the power saving mechanism during the plurality of second time periods.

17. A communication device in a wired communication network, the communication device comprising:

a plurality of transceivers, each transceiver being configured to transmit data via a respective cable among a plurality of cables in the wired communication network, and to selectively operate according to a power saving mechanism that defines (i) an active mode for transmitting data to a respective link partner via the respective cable and (ii) a low power mode during which the respective transceiver quiets transmissions to conserve power, the plurality of transceivers including i) a first transceiver configured to communicate via a first cable among the plurality of cables, and il) a second transceiver configured to communicate via a second cable among the plurality of cables; and a controller that is configured to:

receive crosstalk level information from the plurality of transceivers, the crosstalk level information indicating respective levels of alien crosstalk in respective cables among the plurality of cables, and in response to the crosstalk level information, control multiple transceivers among the plurality of transceivers to operate according to the power saving mechanism to reduce crosstalk, including:

controlling the first transceiver to operate in the low power mode defined by the power saving mechanism during a plurality of first time periods to reduce crosstalk in the second cable during the plurality of first time periods, and control the second transceiver to control the second transceiver to operate according to the power saving mechanism to restrict, to the plurality of first time periods, transmission of data via the second cable.

18. The communication device of claim 17, wherein the controller comprises a crosstalk detector that is configured to:

receive a signal quality measurement regarding data transmitted in the second cable when transmission in the first cable is occurring; and determine that transmission of data in the first cable is causing crosstalk in the second cable based on the signal quality measurement.

19. The communication device of claim 18, wherein the crosstalk detector is configured to:

receive an error rate measurement regarding data transmitted in the second cable when transmission in the first cable is occurring; and determine that transmission of data in the first cable is causing crosstalk in the second cable based on the error rate measurement.

20. The communication device of claim 18, wherein the crosstalk detector is configured to:

receive a signal level measurement that corresponds to (i) when transmission in the second cable is not occurring, and (ii) when transmission in the first cable is occurring; and determine that transmission of data in the first cable is causing crosstalk in the second cable based on the signal level measurement.

21. The communication device of claim 18, wherein the controller is further configured to, in response to the crosstalk detector determining that transmission of the data in the first cable is causing crosstalk in the second cable:

control the second transceiver to operate in the low power mode defined by the power saving mechanism during a plurality of second time periods that are different than the plurality of first time periods, and control the first transceiver to operate in the active mode defined by the power saving mechanism during the plurality of second time periods.

22. The communication device of claim 17, wherein the controller comprises a crosstalk detector that is configured to:

determine that transmission of data in the first cable is causing crosstalk in the second cable; and determine that transmission of data in the second cable is causing crosstalk in the first cable based on determining that transmission of data in the first cable is causing crosstalk in the second cable.

23. The communication device of claim 18, wherein the controller is configured to:

retrieve time-division multiplexing (TDM) scheduling information from a memory; and determine the respective time periods during which the one or more transceivers are to operate in the low power mode defined by the power saving mechanism using the TDM scheduling information.

\* \* \* \* \*